Aug. 28, 1923.
G. FORNACA
PROPULSION OF AIRCRAFT
Filed May 24, 1921
1,466,394
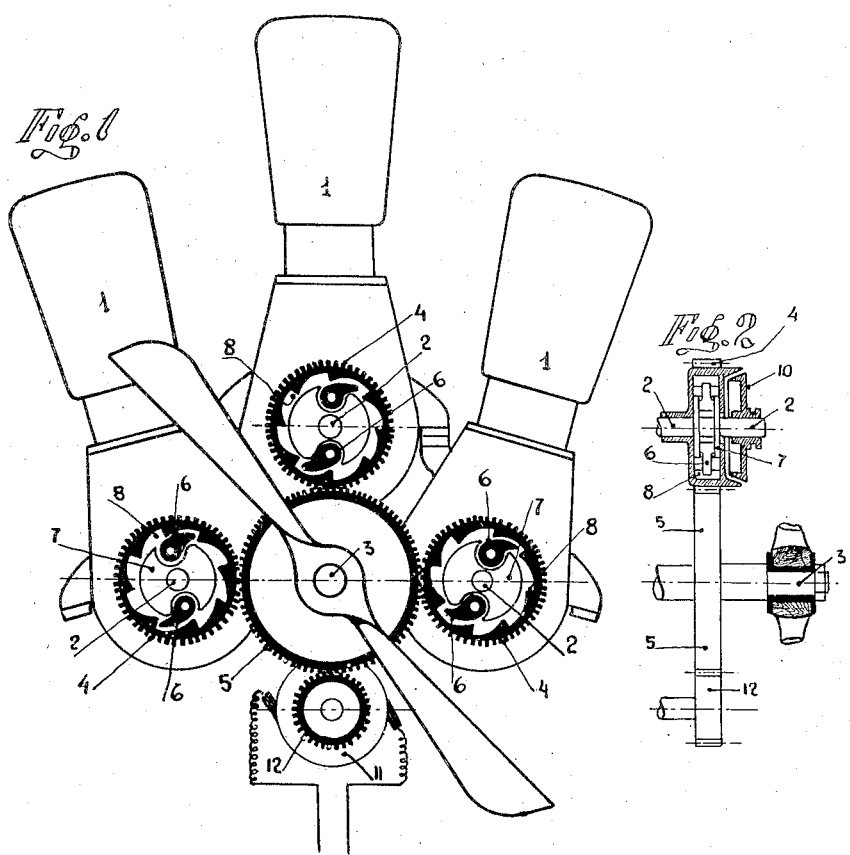

Patented Aug. 28, 1923.

1,466,394

UNITED STATES PATENT OFFICE.

GUIDO FORNACA, OF TURIN, ITALY.

PROPULSION OF AIRCRAFT.

Application filed May 24, 1921. Serial No. 472,303.

*To all whom it may concern:*

Be it known that I, GUIDO FORNACA, a subject of the King of Italy, and residing at 7 Via Giannone, Turin, in the Kingdom of Italy, have invented certain new and useful Improvements in and relating to the Propulsion of Aircraft; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a power unit which is particularly suitable for aerial propulsion. The characteristic feature of the invention consists in the coupling of several motors in parallel, their driving shafts being independent and all contributing to drive, through gearing, a single main propeller shaft. Means are provided to ensure the automatic disconnection from the power unit of those motors the revolutions of which diminish for any reason whatsoever, so that the rotation of the main shaft would continue unimpeded even though one or more motors had stopped, provided that at least one motor in the unit continues normal working. Further, means are provided whereby all the motors can be started either simultaneously or separately, one at a time or in groups. The necessary control can be effected by the pilot from the navigating bridge or station.

The means for ensuring the automatic disconnection of each motor from the main shaft immediately the speed of such motor diminishes with respect to the speed of the other motors, and the means of putting it automatically into gear again as soon as it has recovered its normal speed, consists of a clutch arrangement interposed between the driving shaft of each motor and a driving pinion thereon.

The means for automatically starting the different motors constituting a power unit consists of a clutch arrangement for connecting each driving pinion with its corresponding shaft so that rotation of the main shaft by an auxiliary motor will automatically start all motors wherein, the driving pinion is clutched to its driving shaft. The mechanisms for putting the motors into gear with the driving pinion are operable by independent levers, placed within easy reach of the pilot's hand, so that on starting the main shaft which carries the propeller (for example, by means of an electric starting apparatus) the motors may be started separately, in groups, or simultaneously, by means of the aforesaid gearing-in mechanism.

The power unit constituting the subject matter of this invention affords the greatest possible degree of safety in consequence of the aforementioned characteristics whereby the possibilities of a stoppage of the propeller during flight are reduced to a minimum. If one or more motors should stop during flight the remaining motors would still continue unimpeded working. Under these circumstances it would be possible to examine, repair and restart any motors that might have stopped. Further, this multiple motor power unit offers great facility in starting, whether from the ground or in course of a flight.

In order that the invention may be clearly understood a form or embodiment thereof is illustrated, by way of example, on the appended drawings, whereon:—Fig. 1 is a diagrammatic front view and Fig. 2 is a detail illustrating the gearing-in and clutch arrangement for connecting each driving pinion with its shaft.

The form or embodiment illustrated comprises three motors —1— rigidly attached to one another and to the supports or bearers of the main propeller shaft —3— in such manner as to constitute a single unit which is here designated a multiple motor power unit. Each of these motors may have its own casing, absolutely independent of the others as is shown diagrammatically on the appended drawing. The motor casings are disposed side by side and slightly inclined with respect to each other. The intermediate motor casing has side brackets 1ª which rest on the casings of the adjacent laterally arranged motors. The latter are provided with side brackets 1ᵇ which form the base or supports for the multiple engine. The motors —1— have crankshafts —2— whereon are mounted pinions —4— engaging a spur wheel —5— keyed on the propeller shaft —3—. The crank shafts 2 of the several motors are disposed in a single arc around the propeller shaft 3 at equal distances from the axis of the latter and terminate in the same transverse vertical plane. Between the pinions —4— and shafts —2— are mounted clutch arrangements of any suitable type formed, for example, by means of pawls —6— which are mounted on hubs —7— attached to the shafts —2— and engage serrated internal rims —8— formed integral with the toothed rims —4— constituting the pinions. It is also apparent that when the number of revolutions made by one of the motors diminishes with respect to the revolutions made by the remaining motors, the rim —8— of such motor will override the pawls —6— thus allowing free rotation of the corresponding toothed rim —4— of the pinion even if the motor should stop whilst when the motor again picks up to the normal number of revolutions the pawls resume their engagement with the teeth of the ratchet wheel and transmit the movement of the motor to the main shaft.

A gearing in clutch arrangement —10— is provided in connection with each motor —1— and is adapted to place the crankshaft —2— in connection with the respective toothed rim —4— of the pinion. This gearing-in arrangement permits of the motors being started separately or in groups or simultaneously. In practice, if the propeller shaft —3— is rotated by any suitable means, for example, by means of an electric starting arrangement —11— having a pinion —12— which engages the toothed wheel —5— of shaft —3—, it will put into rotation all the toothed rims —4— of the pinions, and consequently all the motors —1— of which the shafts have been put into engagement with the rims of their respective pinions —4— through the corresponding gearing-in arrangement —10—.

All the levers for working the clutches or gearing-in arrangements —10— and the starting apparatus —11— are suitably arranged in a position readily accessible by the pilot.

Of course the system of coupling up the motors to form a multiple motor and the clutch arrangement and gearing-in system may be varied from the example shown in the diagram, without departing from the scope of the present invention.

Claims:

1. The combination with a driven shaft, of a multiple motor comprising a plurality of independent motors disposed side by side and slightly inclined with respect to each other, said motors having shafts of equal length and terminating in the same transverse plane at equal distances from the axis of the driven shaft, the intermediate motor being supported by the laterally arranged adjacent motors, and supporting members carried by the end motors forming base supports for the multiple motor.

2. The combination with a propeller shaft, of a multiple motor comprising a plurality of independent motors having shafts arranged in an arc around the propeller shaft at equal distances from the axis of the latter, said motor shafts being of equal length and terminating in the same transverse plane, the motor casings being disposed side by side and slightly inclined with respect to each other, the intermediate motor casing being supported on the laterally arranged adjacent motors, a gear on the propeller shaft, gears on the motor shaft meshing with said gear on the propeller shaft and independently operable clutches for connecting the gears to the motor shafts.

3. The combination with a propeller shaft, of a multiple motor comprising a plurality of independent motors having shafts arranged in an arc around the propeller shaft at equal distances from the axis of the latter, said motor shafts being of equal length and terminating in the same transverse plane, the motor casings being disposed side by side and slightly inclined with respect to each other, the intermediate motor casing being supported on the laterally arranged adjacent motors, a gear on the propeller shaft, gears on the motor shaft meshing with said gear on the propeller shaft, independently operable clutches for connecting the gears to the motor shafts, and a starter comprising a driving gear in mesh with the gear on the propeller shaft.

In testimony that I claim the foregoing as my invention, I have signed my name.

GUIDO FORNACA.